(12) United States Patent
Ikeda

(10) Patent No.: US 11,561,425 B2
(45) Date of Patent: Jan. 24, 2023

(54) DISPLAY DEVICE

(71) Applicant: Japan Display Inc., Tokyo (JP)

(72) Inventor: Masanobu Ikeda, Tokyo (JP)

(73) Assignee: JAPAN DISPLAY INC., Tokyo (JP)

( * ) Notice: Subject to any disclaimer, the term of this patent is extended or adjusted under 35 U.S.C. 154(b) by 0 days.

(21) Appl. No.: 17/838,317

(22) Filed: Jun. 13, 2022

(65) Prior Publication Data

US 2022/0397786 A1  Dec. 15, 2022

(30) Foreign Application Priority Data

Jun. 15, 2021 (JP) ............................. JP2021-099444

(51) Int. Cl.
*G02F 1/1333* (2006.01)
*G02F 1/1339* (2006.01)
*G02F 1/1335* (2006.01)
*G02F 1/1343* (2006.01)
*G02F 1/1345* (2006.01)
*G06F 3/041* (2006.01)
*G06F 3/042* (2006.01)

(52) U.S. Cl.
CPC ........ *G02F 1/13338* (2013.01); *G02F 1/1339* (2013.01); *G02F 1/13456* (2021.01); *G02F 1/133512* (2013.01); *G02F 1/133553* (2013.01); *G02F 1/134309* (2013.01); *G06F 3/0412* (2013.01); *G06F 3/0421* (2013.01); *G02F 2201/56* (2013.01); *G02F 2202/28* (2013.01)

(58) Field of Classification Search
CPC ........... G02F 1/133615; G02F 2202/28; G02F 1/1339; G02F 2201/58; G02F 1/13338; G06F 3/0421; G06F 3/0412
See application file for complete search history.

(56) References Cited

U.S. PATENT DOCUMENTS

| | | | |
|---|---|---|---|
| 2004/0140961 A1* | 7/2004 | Cok | H01L 27/323 345/175 |
| 2008/0007674 A1* | 1/2008 | Akiyama | G02F 1/1339 349/65 |
| 2011/0115705 A1* | 5/2011 | Watanabe | G06F 3/03547 345/158 |
| 2017/0269433 A1* | 9/2017 | Sugiyama | G02B 6/0031 |
| 2021/0265532 A1* | 8/2021 | Itou | G09F 9/00 |
| 2022/0059042 A1 | 2/2022 | Ogawa et al. | |

FOREIGN PATENT DOCUMENTS

| | | |
|---|---|---|
| JP | 2020-85938 A1 | 6/2020 |
| JP | 2020-187179 A | 11/2020 |

* cited by examiner

*Primary Examiner* — Jessica M Merlin
(74) *Attorney, Agent, or Firm* — Xsensus LLP

(57) ABSTRACT

According to one embodiment, a display device includes a first substrate, a second substrate, a liquid crystal layer and a seal. The second substrate is opposed to the first substrate. The liquid crystal layer is disposed between the first substrate and the second substrate. The seal bonds the first substrate to the second substrate together and seals the liquid crystal layer. The first substrate includes a light source disposed at a position overlapping the seal in a planar view. The light source is sealed by the seal.

10 Claims, 8 Drawing Sheets

DISPLAY DEVICE

CROSS-REFERENCE TO RELATED APPLICATIONS

This application is based upon and claims the benefit of priority from Japanese Patent Application No. 2021-099444, filed Jun. 15, 2021, the entire contents of which are incorporated herein by reference.

FIELD

Embodiments described herein relate generally to a display device.

BACKGROUND

In recent years, wearable devices equipped with a touch detection function (e.g., wristwatch-type wearable devices and the like) have been gradually widespread. Such a wearable device is often provided with a reflective type liquid crystal display panel. Although the reflective type liquid crystal display panel is excellent in visibility in an environment with high external light intensity, the reflective type liquid crystal display panel has a problem that the visibility is degraded in an environment with low external light intensity.

In order to solve this problem, a configuration is proposed in which a front light that emits light from above a liquid crystal display panel toward the liquid crystal display panel is provided. However, in this configuration, since it is necessary to provide a substrate for the front light separately from the liquid crystal display panel, there is another problem that the device size is enlarged and the device is not suitable for a wearable device.

DETAILED DESCRIPTION

Figure 1:
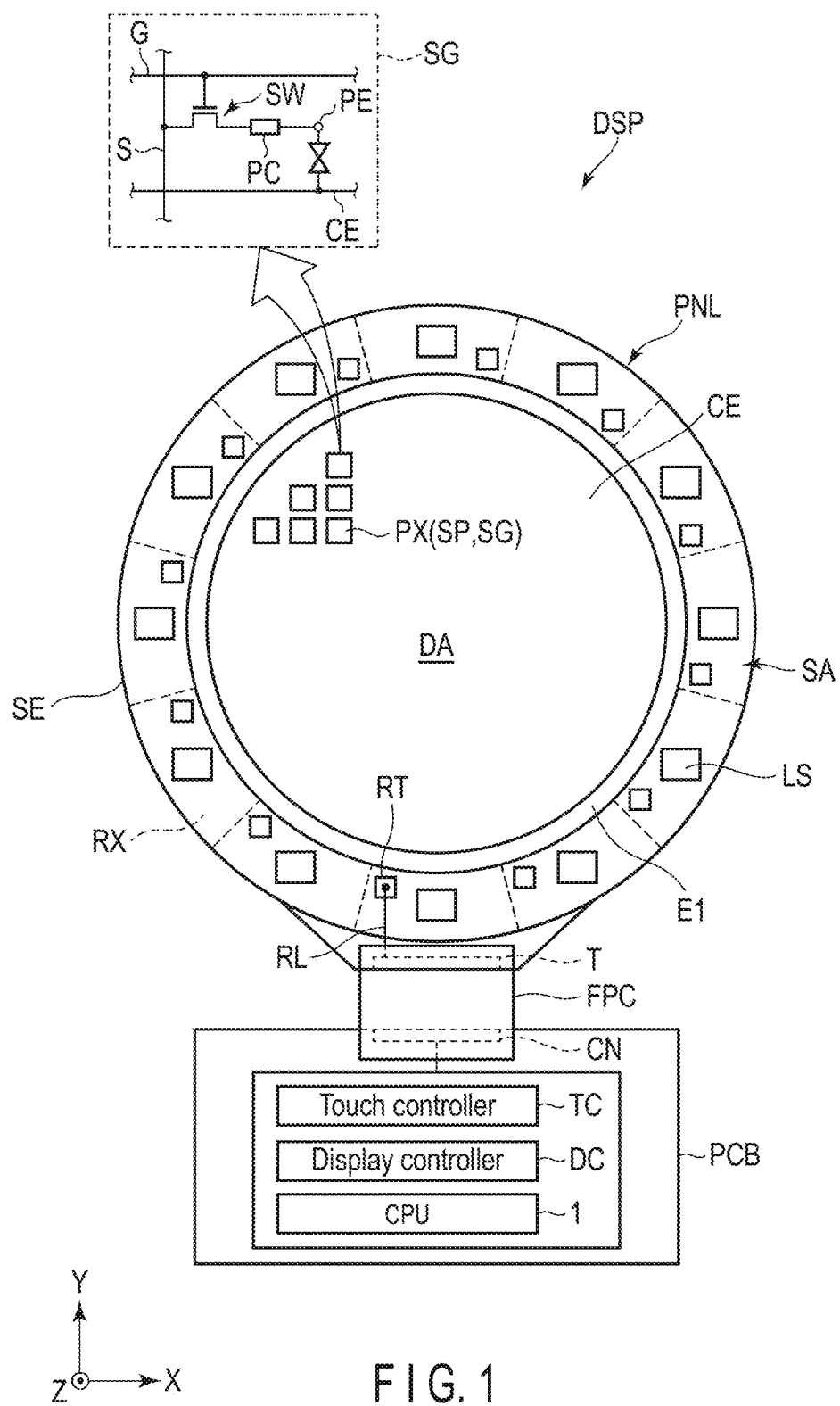
FIG. 1 is a plan view showing a configuration example of a display device according to an embodiment.

In general, according to one embodiment, a display device comprises a first substrate, a second substrate, a liquid crystal layer and a seal. The second substrate is opposed to the first substrate. The liquid crystal layer is disposed between the first substrate and the second substrate. The seal bonds the first substrate to the second substrate together and seals the liquid crystal layer. The first substrate includes a light source disposed at a position overlapping the seal in a planar view. The light source is sealed by the seal.

Embodiments will be described hereinafter with reference to the accompanying drawings.

The disclosure is merely an example, and proper changes within the spirit of the invention, which are easily conceivable by a skilled person, are included in the scope of the invention as a matter of course. In addition, in some cases, in order to make the description clearer, the widths, thicknesses, shapes, etc., of the respective parts are schematically illustrated in the drawings, compared to the actual modes. However, the schematic illustration is merely an example, and adds no restrictions to the interpretation of the invention. Besides, in the specification and drawings, the same or similar elements as or to those described in connection with preceding drawings or those exhibiting similar functions are denoted by like reference numerals, and a detailed description thereof is omitted unless otherwise necessary.

In the present embodiment, a display device equipped with a touch detection function will be described as an example of a display device. The touch detection sensing includes various methods such as optical sensing, resistive sensing, capacitive sensing, and electromagnetic inductive sensing. Among the various methods of detection sensing described above, the capacitive sensing is detection sensing using a change in electrostatic capacitance due to the approach or contact of an object (e.g., a finger), and has advantages that the sensing can be realized with a relatively simple structure, that power consumption is small, and the like. In the present embodiment, a display device equipped with a touch detection function using capacitive sensing will be mainly described.

Note that the capacitive sensing includes mutual capacitive sensing in which an electric field is generated across a pair of transmission electrodes (drive electrodes) and reception electrodes (detection electrodes) disposed in a state in which these electrodes are spaced apart from each other, and a change in the electric field due to the approach or contact of an object is detected, and self-capacitive sensing in which a change in electrostatic capacitance due to the approach or contact of an object is detected using one electrode. In the present embodiment, a display device equipped with a touch detection function using self capacitive sensing will be mainly described.

FIG. 1 is a plan view showing a configuration example of a display device DSP according to this embodiment. In this embodiment, a first direction X, a second direction Y and a third direction Z are orthogonal to each other, but they may intersect at an angle other than 90 degrees. The first direction X and the second direction Y correspond to the directions parallel to a main surface of a substrate that constitutes the display device DSP. The third direction Z is equivalent to a thickness direction of the display device DSP. In the following descriptions, a direction forwarding a tip of an arrow indicating the third direction Z may be referred to as "upward" and a direction forwarding oppositely from the tip of the arrow may be referred to as "downward". Further, viewing from above downward onto an X-Y plane defined by the first direction X and the second direction Y is referred to as planar view. In addition, it is assumed that there is an observation position to observe the semiconductor substrate on a tip side of an arrow in a third direction Z, and viewing from this observation position toward the X-Y plane defined by the first direction X and the second direction Y is referred to as a planar view.

As shown in FIG. 1, the display device DSP includes a display panel PNL, a flexible printed circuit FPC, and a circuit board PCB. The display panel PNL and the circuit board PCB are electrically connected through the flexible printed circuit FPC. More specifically, a terminal T of the display panel PNL and a connector CN of the circuit board PCB are electrically connected through the flexible printed circuit FPC.

The display panel PNL includes a display area DA that displays an image and a peripheral area SA in a frame shape surrounding the display area DA. Pixels PX are disposed in the display area DA. Specifically, in the display area DA, a large number of pixels PX are arranged in a matrix along the first direction X and the second direction Y. In the present embodiment, the pixel PX includes sub-pixels SP in red (R), green (G), and blue (B). In addition, the sub-pixels SP each include a plurality of segment pixels SG. The segment pixels SG each have pixel electrodes having different areas, and by switching between display and non-display of the segment pixels SG, gradation is formed for each sub-pixel SP.

As shown in an enlarged manner in FIG. 1, the segment pixel SG includes a switching element SW, a pixel circuit PC, a pixel electrode PE, a common electrode CE, a liquid crystal layer LC, and the like. The switching element SW is formed of, for example, a thin-film transistor (TFT), and is electrically connected to a scanning line G and a signal line S. The scanning line G is electrically connected to the switching element SW in each of the segment pixels SG arranged in the first direction X. The signal line S is electrically connected to the switching element SW in each of the segment pixels SG arranged in the second direction Y. To the pixel electrode PE, a predetermined potential based on the output from the pixel circuit PC is applied. The pixel electrodes PE each face the common electrode CE disposed on the entire surface of the display area DA, and drives the liquid crystal layer LC by an electric field generated across the pixel electrode PE and the common electrode CE.

Note that in the present embodiment, although the sub-pixels SP each have the segment pixels SG, the present invention is not limited to this, and the sub-pixels SP may each have one segment pixel SG. In this case, the sub-pixel SP corresponds to the segment pixel SG shown in an enlarged manner in FIG. 1, and the switching element SW, the pixel circuit PC, and the pixel electrode PE are formed for each sub-pixel SP.

Among the concentric circles shown in FIG. 1, an area of a circle located on the innermost side corresponds to the display area DA, and an area obtained by excluding a circle located on the innermost side from a circle located on the outermost side corresponds to the peripheral area SA. Note that in the present embodiment, the case is exemplified in which the display area DA has a circular shape, and the peripheral area SA surrounding the display area DA also has the same shape. However, the present invention is not limited to this. The display area DA does not necessarily have a circular shape, and the peripheral area SA may have a shape of a system different from that of the display area DA. For example, the display area DA and the peripheral area SA may have a polygonal shape. Further, in the case in which the display area DA has a polygonal shape, the peripheral area SA may have a circular shape having a shape of a system different from that of the display area DA.

As shown in FIG. 1, a seal SE that seals the liquid crystal layer LC is disposed in the peripheral area SA. At a position overlapping the seal SE in a planar view, a plurality of detection electrodes (sensor electrodes) RX is disposed in an island-like shape. In other words, the detection electrodes RX is disposed in an island-like shape so as to surround the display area DA in the peripheral area SA.

Although details will be described later, each of the detection electrodes RX is electrically connected to a detection electrode terminal RT through a conductive material (conductive bead coated with metal) included in the seal SE. From each detection electrode terminal RT, a detection line RL extends toward the terminal T. The detection line RL is used for supplying a drive signal to the detection electrode RX and outputting a detection signal from the detection electrode RX.

Although one detection line RL is alone shown in FIG. 1 for convenience of description, the detection line RL actually extends from each detection electrode terminal RT toward the terminal T. In addition, although FIG. 1 shows a configuration in which 12 detection electrodes RX are disposed as the detection electrodes RX, the number of detection electrodes RX is not limited to this, and any number of detection electrodes RX may be disposed.

As shown in FIG. 1, a plurality of light sources LS is disposed at positions overlapping the seal SE in a planar view, and the light sources LS is sealed by the seal SE. In other words, the seal SE seals the liquid crystal layer LC and seals the light sources LS. The light source LS is a light emitting diode (LED), and is, for example, a micro LED or a mini LED. The light source LS is turned on when the approach or contact of an object is detected by the detection electrode RX. For this reason, for example, the light sources LS are disposed as many as the detection electrodes RX. As shown in FIG. 1, the light source LS is disposed so as to overlap the detection electrode RX in a planar view, and is disposed so as not to overlap the detection electrode RX and the detection electrode terminal RT electrically connected to the detection electrode RX through conductive beads.

As shown in FIG. 1, a shielding electrode E1 is disposed so as to be positioned between the common electrode CE and the detection electrodes RX in a planar view. To the shielding electrode E1, a predetermined fixed potential or a ground potential is applied through a line (not shown). Alternatively, the shielding electrode E1 is set in a floating state in which the shielding electrode E1 is not electrically connected to any component. According to this, the shielding electrode E1 can block the influence of the common electrode CE on the detection electrode RX.

As shown in FIG. 1, a touch controller TC, a display controller DC, a CPU 1, and the like are disposed on the circuit board PCB. The touch controller TC outputs a drive signal to the detection electrodes RX disposed on the display panel PNL, and receives an input of a detection signal from the detection electrodes RX (i.e., the approach or contact of an external object is detected). The touch controller TC may be referred to as a detector. The display controller DC outputs a video signal indicating an image displayed in the display area DA of the display panel PNL. The CPU 1 outputs a synchronization signal that defines operation timings of the touch controller TC and the display controller DC, performs an operation according to a touch detected by the touch controller TC (e.g., the lighting process of the light source LS), and the like.

Note that FIG. 1 shows the case in which the touch controller TC, the display controller DC, and the CPU 1 are realized by one semiconductor chip. However, these mounting forms are not limited to this, and each component may be mounted on the circuit board PCB after separating only the touch controller TC as a separate body. Alternatively, the touch controller TC and the CPU 1 may be separately mounted on the circuit board PCB, and the display controller DC may be mounted on the display panel PNL by chip on glass (COG). Alternatively, only the CPU 1 may be mounted on the circuit board PCB, and the touch controller TC and the display controller DC may be mounted on the display panel PNL by COG.

Figure 2:
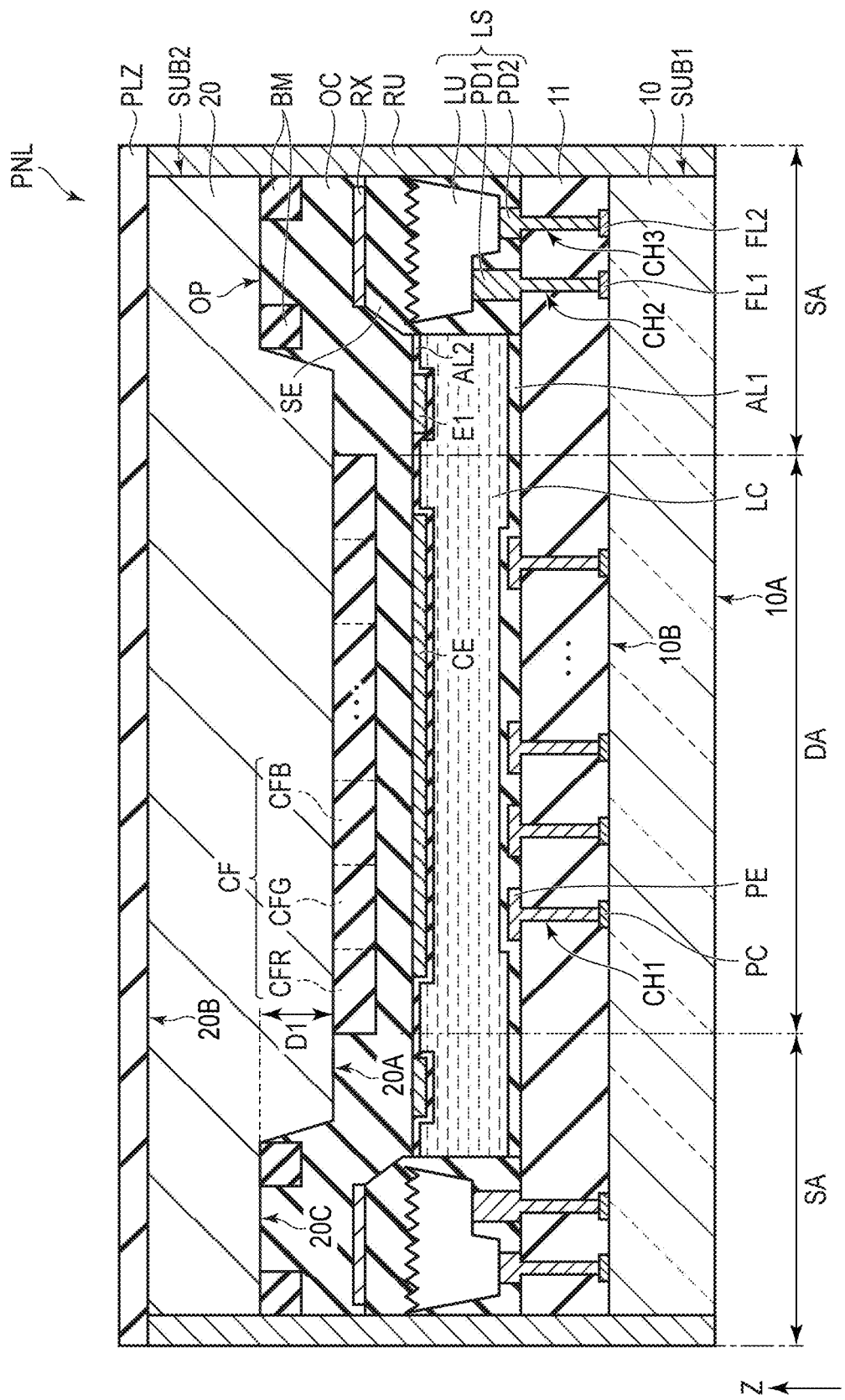
FIG. 2 is a cross-sectional view showing a configuration example of a display panel according to the embodiment.

FIG. 2 is a cross-sectional view showing a schematic configuration example of the display panel PNL according to the present embodiment. In the following, the configuration on the display area DA side and the configuration on the peripheral area SA side will be described.

The display device PNL includes a first substrate SUB1, a second substrate SUB2, the seal SE, the liquid crystal layer LC, a reflection unit RU, and a polarizer PLZ.

The first substrate SUB1 and the second substrate SUB2 overlap each other in a planar view, and are bonded to each other with the seal SE. The liquid crystal layer LC is held between the first substrate SUB1 and the second substrate SUB2, and is sealed with the seal SE. The seal SE includes conductive beads (not shown), and thus the configuration on the first substrate SUB1 side is electrically connected to the configuration on the second substrate SUB2 side. As described above, the seal SE also functions as a sealing layer of the light source LS. The reflection unit RU is formed of a material having a reflection property, and covers the side surfaces of the first substrate SUB1, the second substrate SUB2, and the seal SE. The polarizer PLZ is disposed on the second substrate SUB2 and the reflection unit RU.

As shown in FIG. 2, on the display area DA side, the first substrate SUB1 includes a transparent substrate 10, the pixel circuit PC, a planarizing film 11, the pixel electrode PE, and an alignment film AL1. Although the first substrate SUB1 includes the scanning line G, the signal line S, the switching element SW, and the like shown in FIG. 1 in addition to the above-described configuration, these components are not shown in FIG. 2.

The transparent substrate 10 is formed in a plate-like shape parallel to the X-Y plane. The transparent substrate 10 includes a main surface (lower surface) 10A and a main surface (upper surface) 10B on the opposite side of the main surface 10A. The pixel circuit PC is disposed on the main surface 10B side. The planarizing film 11 includes at least one insulating film and covers the pixel circuit PC. The pixel electrode PE is disposed on the planarizing film 11, and is connected to the pixel circuit PC through a contact hole CH1 formed in the planarizing film 11. The alignment film AL1 covers the pixel electrode PE and is in contact with the liquid crystal layer LC.

As shown in FIG. 2, on the display area DA side, the second substrate SUB2 includes a transparent substrate 20, a color filter CF, an overcoat layer OC, the common electrode CE, and an alignment film AL2. In the following, first, the shape of the transparent substrate 20 will be described with reference to FIG. 3. After that, the above-described configuration of the second substrate SUB2 will be described with reference to FIG. 2 again.

Figure 3:
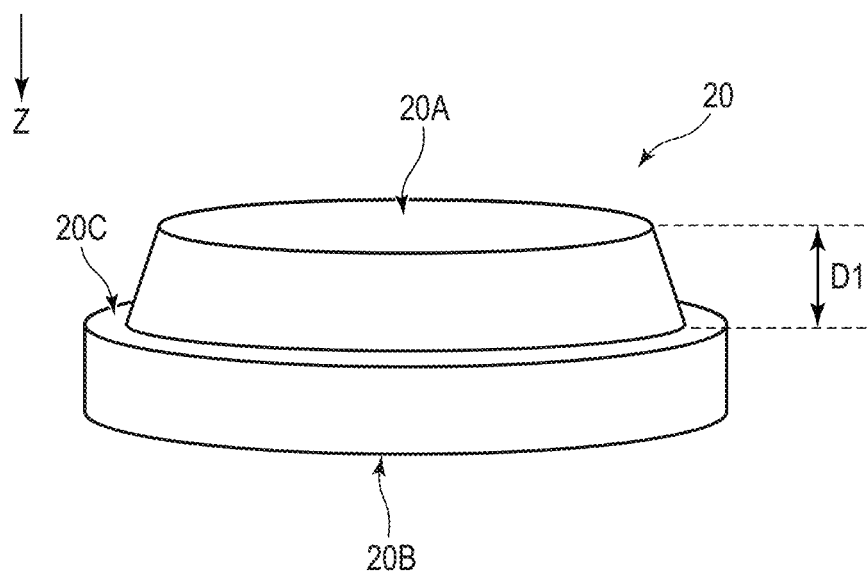
FIG. 3 is a perspective view showing a shape of a transparent substrate according to the embodiment.

FIG. 3 is a perspective view showing a shape of the transparent substrate 20 according to the present embodiment.

As shown in FIG. 3, the transparent substrate 20 has a shape including a step. More specifically, the transparent substrate 20 has a shape in which a cylinder and a truncated cone having bottom surfaces different in size are combined. The transparent substrate 20 includes a main surface 20A corresponding to the upper surface of the truncated cone, a main surface 20B corresponding to the bottom surface of the cylinder and facing the main surface 20A, and a main surface 20C located between the main surface 20A and the main surface 20B in a substrate thickness direction (third direction Z). The main surfaces 20A to 20C are arranged along the third direction Z in order of the main surface 20A, the main surface 20C, and the main surface 20B.

A distance D1 (i.e., a height D1 of the truncated cone) from the main surface 20A to the main surface 20C along the third direction Z corresponds to a step. The distance D1 corresponds to a distance that planarizes a gap between the light source LS mounted on the first substrate SUB1 and the liquid crystal layer LC disposed between the first substrate SUB1 and the second substrate SUB2. Note that in the present embodiment, although the case is shown in which the transparent substrate 20 has a shape in which a cylinder and a truncated cone having bottom surfaces different in size are combined and includes a tapered step is shown, the transparent substrate 20 may have a shape in which two types of cylinders having bottom surfaces different in size are combined and include a step extending along the third direction Z.

The description returns to FIG. 2 again.

As described above, the transparent substrate 20 has the step protruding toward the first substrate SUB1. In the display area DA, the main surface 20A of the transparent substrate 20 faces the main surface 10B of the transparent substrate 10. The color filter CF is disposed on the main surface 20A side of the transparent substrate 20. The color filter CF includes a red color filter CFR, a green color filter CFG, a blue color filter CFB, and the like. The overcoat layer OC covers the color filter CF. The common electrode CE is disposed across the pixels PX and faces the pixel electrodes PE in the third direction Z. The common electrode CE is disposed on the overcoat layer OC. The alignment film AL2 covers the common electrode CE and is in contact with the liquid crystal layer LC.

Note that in FIG. 2, the configuration is described as the configuration of the second substrate SUB2 on the display area DA side in which a light-shielding film that partitions the segment pixels SG is not provided. However, a configuration may be provided in which a light-shielding film is provided to partition the segment pixels SG and the light-shielding film overlaps a part of the color filter CF.

The liquid crystal layer LC is disposed between the alignment film AL1 and the alignment film AL2.

The transparent substrates 10 and 20 are insulating substrates such as a glass base material and a plastic substrate. The planarizing film 11 is made of a transparent insulating material such as silicon oxide, silicon nitride, silicon oxynitride, or acrylic resin. In one example, the planarizing film 11 includes an inorganic insulating film and an organic insulating film. The pixel electrode PE is formed as a reflecting electrode, and has, for example, a three-layer stacked structure of indium zinc oxide (IZO), silver (Ag), and indium zinc oxide (IZO). The common electrode CE is a transparent electrode formed of a transparent conductive material such as indium tin oxide (ITO) or indium zinc oxide (IZO). The alignment films AL1 and AL2 are horizontal alignment films having an alignment restriction force substantially parallel to the X-Y plane. The alignment restriction force may be imparted by rubbing treatment or photo-alignment treatment.

As shown in FIG. 2, on the peripheral area SA side, the first substrate SUB1 includes the transparent substrate 10, a first feeder line FL1, a second feeder line FL2, the planarizing film 11, the light source LS, and the alignment film AL1. The light source LS includes a light emitting unit LU, a first terminal electrode (first pad) PD1, and a second terminal electrode (second pad) PD2. The first terminal electrode PD1 is an electrode that functions as an anode electrode or a cathode electrode of the light source LS. The second terminal electrode PD2 is an electrode that functions as a cathode electrode or an anode electrode of the light source LS. In the following, the detailed description of the configuration already described on the display area DA side will be omitted.

On the transparent substrate 10, the first feeder line FL1 and the second feeder line FL2 are disposed. The first feeder line FL1 and the second feeder line FL2 are covered with the planarizing film 11. The light source LS is disposed on the planarizing film 11 at a position overlapping the seal SE in a planar view. The first terminal electrode PD1 of the light source LS is electrically connected to the first feeder line FL1 through a conductive layer in a contact hole CH2 formed in the planarizing film 11 and solder (not shown) provided on the conductive layer. The second terminal electrode PD2 of the light source LS is electrically connected to the second feeder line FL2 through a conductive layer in a contact hole CH3 formed in the planarizing film 11 and solder (not shown) provided on the conductive layer.

The light emitting unit LU has an emission surface (upper surface) that emits light on a side opposite to a surface (lower surface) in contact with the first terminal electrode PD1 and the second terminal electrode PD2. The emission surface of the light emitting unit LU faces the main surface 20C of the transparent substrate 20. For example, white (W) light is emitted from the light emitting unit LU. Note that the color of the light emitted from the light emitting unit LU is not limited to the above-described white, and may be, for example, red (R), green (G), or blue (B). Furthermore, the light emitting unit LU may further emit light not only from the above-described emission surface but also from a side surface, a lower surface, or the like. Note that in the present embodiment, although it is assumed that one light source LS is provided for one detection electrode RX, for example, three light sources LS may be provided for one detection electrode RX. In this case, it is possible to emit light of various colors by mounting the three light sources LS with the emitted light separated in three colors of RGB and adjusting the intensities of RGB colors.

As shown in FIG. 2, on the peripheral area SA side, the second substrate SUB2 includes the transparent substrate 20, a light-shielding film BM, the overcoat layer OC, the shielding electrode E1, the alignment film AL2, and the detection electrode RX. In the following, the detailed description of the configuration already described on the display area DA side will be omitted.

The light-shielding film BM is disposed on the main surface 20C of the transparent substrate 20. The light-shielding film BM is disposed across substantially the entire surface of the main surface 20C. However, the light-shielding film BM has an opening OP at a position facing the emission surface of the light source LS. According to this, it is possible to extract the light emitted directly above the light source LS from the opening OP to the outside. The light extracted from the opening OP illuminates a part of the peripheral area SA, and a luxurious feeling can be presented. Therefore, it is possible to improve the design of the display device DSP.

The overcoat layer OC covers the main surface 20A of the transparent substrate 20 in the peripheral area SA, the step having the distance D1 along the third direction Z, and the light-shielding film BM. On the overcoat layer OC, the shielding electrode E1 and the detection electrode RX are disposed. The shielding electrode E1 is disposed on the main surface 20A side of the transparent substrate 20, and the detection electrode RX is disposed on the main surface 20C side of the transparent substrate 20. In the configuration shown in FIG. 2, the shielding electrode E1 and the detection electrode RX are disposed in the same layer as the common electrode CE on the display area DA side, and are formed of, for example, the same transparent conductive material as the material of the common electrode CE. The alignment film AL2 covers the shielding electrode E1 and is in contact with the liquid crystal layer LC.

The detection electrode RX is disposed at a position overlapping the seal SE in a planar view. The detection electrode RX is disposed away from the reflection unit RU covering the side surface of the second substrate SUB2. In other words, the detection electrode RX is disposed so as not to be in contact with the reflection unit RU. According to this, even though the reflection unit RU is formed of a metal material, which is one of materials having a reflection property, it is possible to keep the detection electrode RX from being electrically connected to the reflection unit RU.

Figure 4:
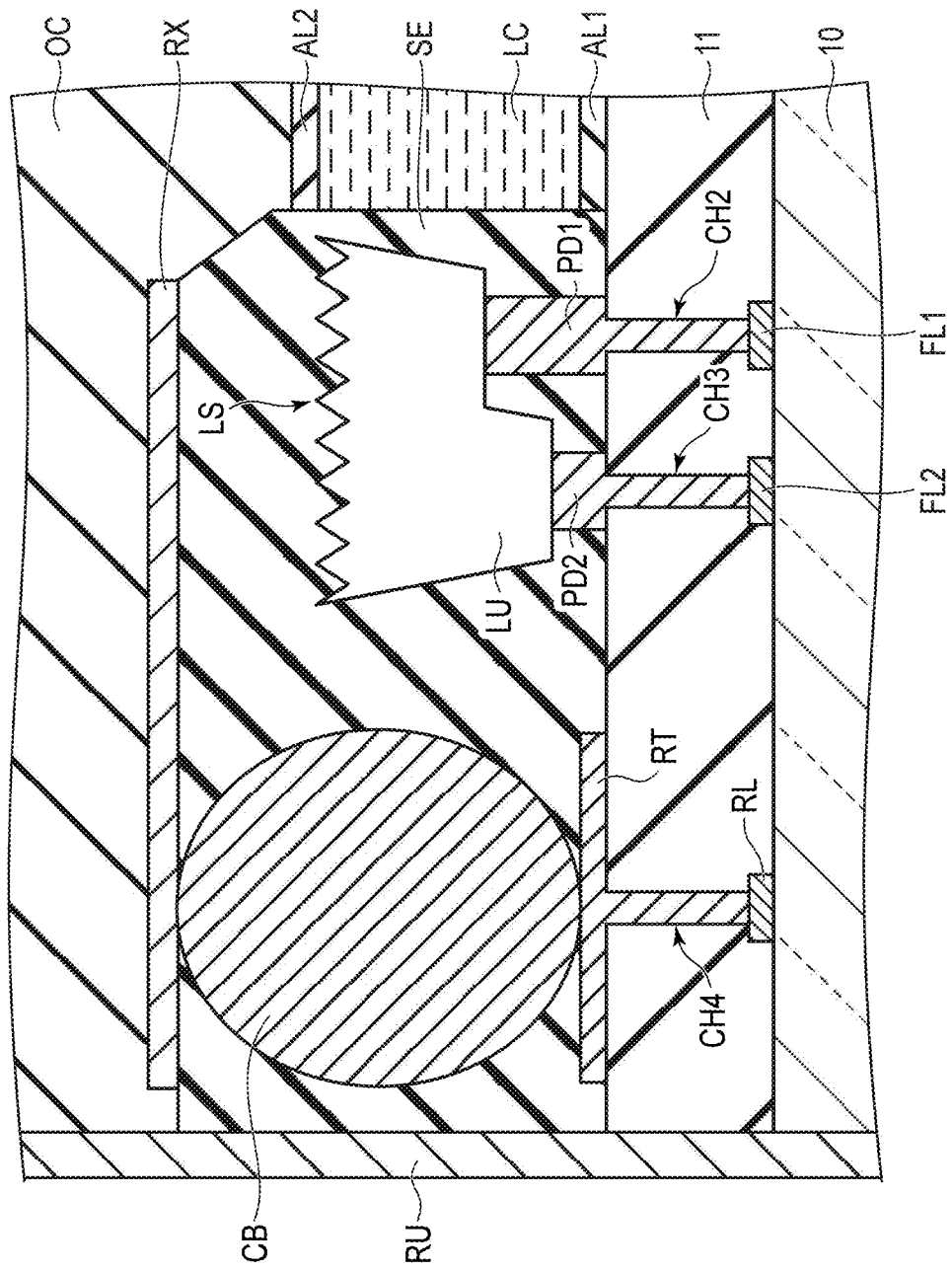
FIG. 4 is a cross-sectional view showing a configuration relating to a detection electrode according to the embodiment.

FIG. 4 is a cross-sectional view showing a cross section different from the cross section shown in FIG. 2 and mainly showing a configuration relating to the detection electrode RX.

As shown in FIG. 4, the detection line RL is disposed on the transparent substrate 10 as a configuration relating to the detection electrode RX. The detection line RL is covered with the planarizing film 11. The detection electrode terminal RT is disposed on the planarizing film 11. The detection electrode terminal RT is connected to the detection line RL through a contact hole CH4 formed in the planarizing film 11. The detection electrode terminal RT is electrically connected to the detection electrode RX through the conductive bead CB included in the seal SE. The configuration relating to the detection electrode RX, specifically, the detection electrode RX, the detection electrode terminal RT, and the detection line RL are disposed so as not to contact the reflection unit RU, and a predetermined interval is provided between the configuration relating to the detection electrode RX and the reflection unit RU. According to this, as described above, even though the reflection unit RU is formed of a metal material, it is possible to keep the configuration relating to the detection electrode RX from being electrically connected to the reflection unit RU.

As shown in FIG. 4, the detection electrode RX is disposed at a position overlapping the light source LS in a planar view, while the detection electrode terminal RT and the detection line RL are disposed at positions not overlapping the light source LS in a planar view. In other words, the conductive bead CB included in the seal SE is not disposed at a position overlapping the light source LS in a planar view. According to this, it is possible to keep the conductive beads CB included in the seal SE from coming into contact with the first terminal electrode PD1 and the second terminal electrode PD2 constituting the light source LS for short-circuiting.

Figure 5:
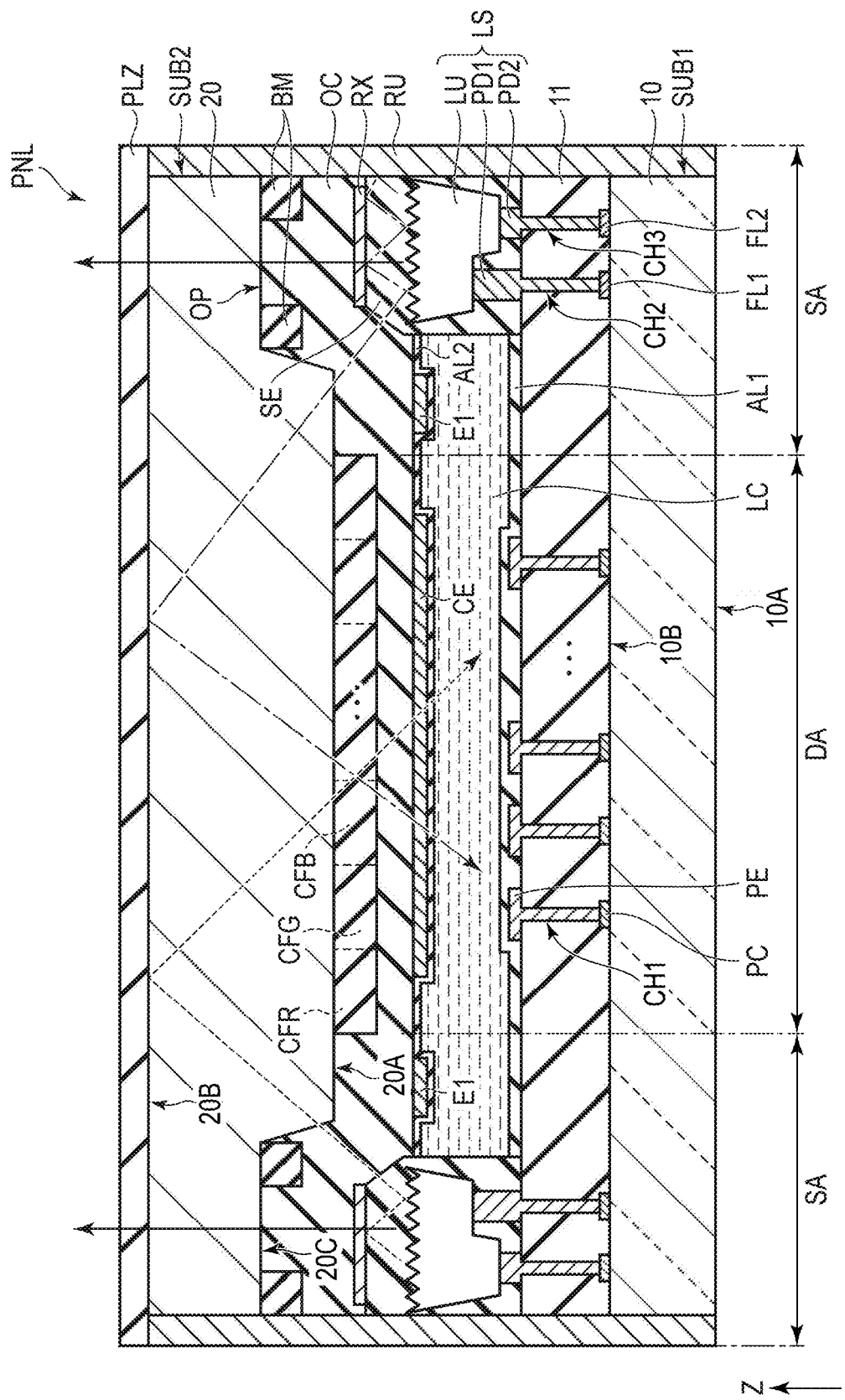
FIG. 5 is a view that describes an optical path of light emitted from a light source according to the embodiment.

FIG. 5 is a view that describes an optical path of light emitted from the light source LS. As indicated by a solid line in FIG. 5, light emitted from the light source LS directly upward transmits the opening OP formed in the light-shielding film BM and is extracted to the outside. Further, as indicated by a broken line in FIG. 5, a part of the light emitted from the light source LS is repeatedly reflected between the detection electrode RX and the emission surface of the light source LS, and then enters the transparent substrate 20. A part of the light incident on the transparent substrate 20 is reflected off the polarizer PLZ, then transmitted through the color filter CF, the overcoat layer OC, the common electrode CE, and the liquid crystal layer LC, and applied to the pixel electrode PE that functions as a reflecting electrode. The light applied to the pixel electrode PE is reflected off the pixel electrode PE and extracted to the outside. As described above, a part of the light emitted from the light source LS is extracted from the display area DA to the outside as light contributing to the display of an image.

Furthermore, as indicated by an alternate long and short dashed line in FIG. 5, a part of the light emitted from the light source LS is reflected off the reflection unit RU, and then repeatedly reflected between the detection electrode RX and the emission surface of the light source LS, and enters the transparent substrate 20. Since the reflection unit RU is provided as described above, light that escapes from the side surface of the second substrate SUB2 can be reflected off the reflection unit RU and made incident on the transparent substrate 20. According to this, such light can also be extracted to the outside from the display area DA as light contributing to the display of an image.

Figure 6:
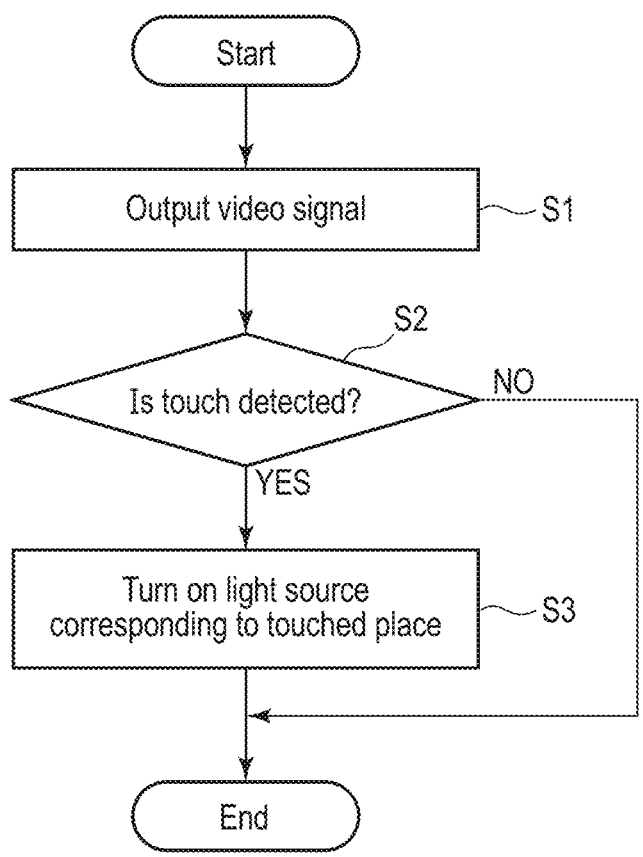
FIG. 6 is a flowchart that describes a lighting process of the light source according to the embodiment.

FIG. 6 is a flow chart that describes the lighting process of the light source LS. First, the display controller DC outputs a video signal indicating an image displayed in the display area DA of the display panel PNL (Step S1). According to this, an image (e.g., a content image and any other image) corresponding to the video signal is displayed in the display area DA.

Subsequently, the touch controller TC outputs a drive signal to the detection electrodes RX disposed on the display panel PNL, and receives an input of a detection signal from each detection electrode RX as a response to this. The touch controller TC detects a touch based on detection signals input from the detection electrodes RX. When a touch is detected by the touch controller TC (YES in Step S2), the CPU 1 turns on the light source LS disposed at a place corresponding to the detected touch (Step S3). According to this, it is possible to turn on the light source LS corresponding to the touched place, and it is possible to use the light emitted from the light source LS can be used for the image displayed in the display area DA.

Note that here, as an example of the lighting process of the light source LS, the case is shown in which the light source LS corresponding to the touched place is turned on. However, the present invention is not limited to this. For example, when the touch controller TC detects a touch, all the light sources LS disposed in the peripheral area SA may be turned on.

The display panel PNL according to an embodiment described above includes the light sources LS disposed at positions overlapping the seal SE disposed in the peripheral area SA in a planar view. According to this, since it is not necessary to separately provide a substrate for the light source LS as in a so-called front light system in which a front light is installed above a liquid crystal display panel, it is possible to suppress an increase in device size. On the other hand, since the light source LS is disposed, the light from the light source LS can be used for the image displayed in the display area DA, it is possible to ensure sufficient luminance even in an environment in which external light intensity is weak.

In addition, in the display panel PNL according to the present embodiment, since the light source LS is disposed at a position overlapping the seal SE disposed in the peripheral area SA in a planar view as described above, the seal SE can function not only as a sealing layer that seals the liquid crystal layer LC but also as a sealing layer that seals the light source LS. In other words, since it is not necessary to separately provide a sealing layer for the light source LS, it is possible to reduce the number of manufacturing processes, and it is possible to reduce costs.

Furthermore, in the display device DSP according to the present embodiment, the light source LS is turned on only when a touch is detected by the detection electrodes RX disposed in the peripheral area SA, and is not always turned on. Therefore, it is possible to achieve power saving.

In addition, the display panel PNL according to the present embodiment includes the transparent substrate 20 including a step protruding to the first substrate SUB1 side, the common electrode CE disposed on the main surface 20A side of the transparent substrate 20, and the detection electrode RX disposed on the main surface 20C side of the transparent substrate 20. According to this, since the common electrode CE and the detection electrode RX can be disposed at different heights, the detection electrode RX is less likely to be affected by the common electrode CE due to the distance, as compared with the case in which the common electrode CE and the detection electrode RX are disposed at the same height. In other words, it is possible to suppress error detection of a touch that may occur due to the influence of the common electrode CE on the detection electrode RX. In addition, in accordance with the configuration according to the present embodiment, the detection electrode RX can be disposed in the vicinity of the panel surface of the display panel PNL, and the distance between the detection electrode RX and the external object can be shortened as compared with the case in which the detection electrode RX is disposed at the same height in accordance with the common electrode CE, and thus it is possible to improve touch sensitivity.

Figure 7:
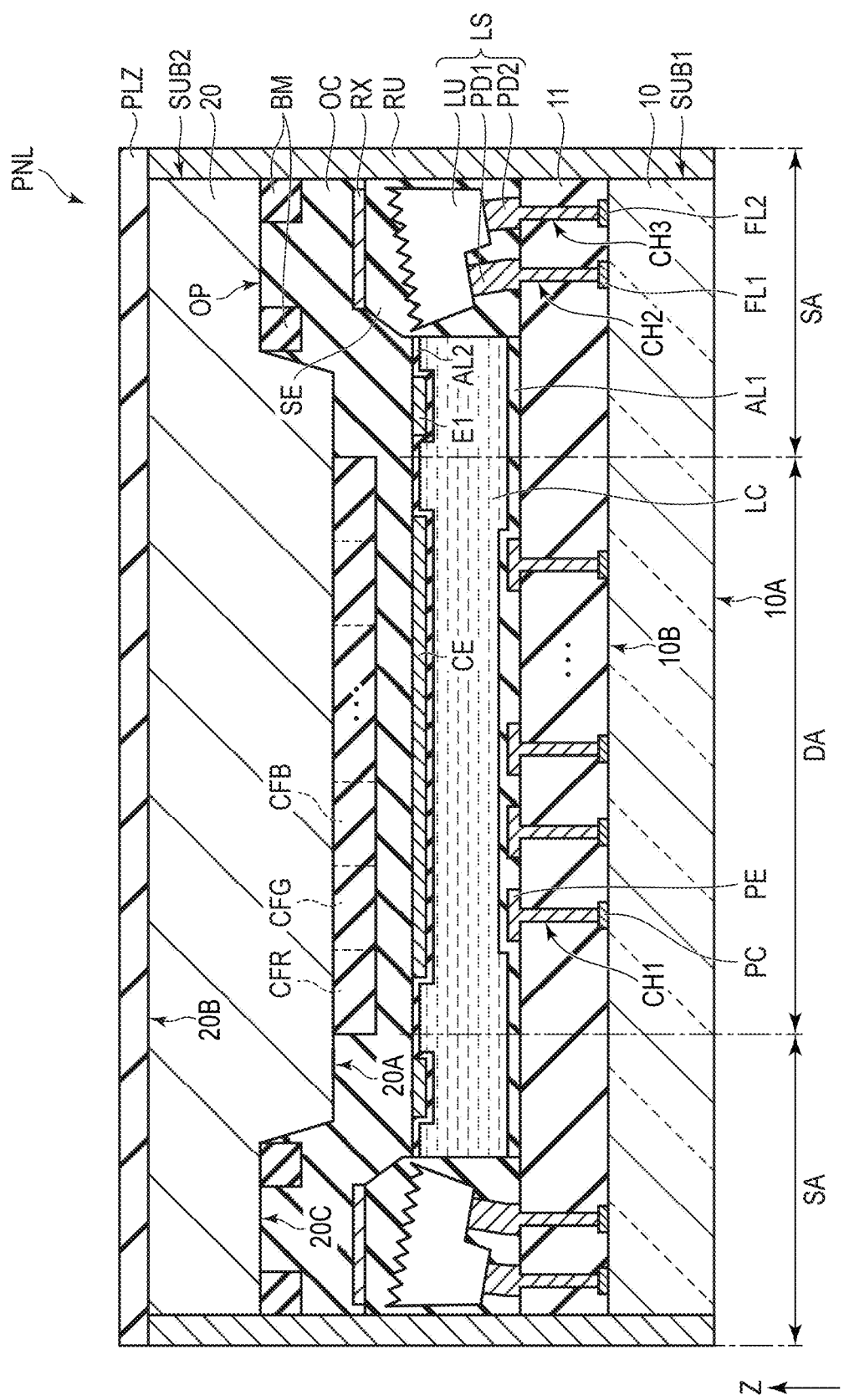
FIG. 7 is a view that describes a modified example of the embodiment.

FIG. 7 is a view that describes a modified example of the present embodiment. The modified example shown in FIG. 7 is different from the configuration shown in FIG. 2 in that the light source LS is disposed tin inclination toward the display area DA side and the emission surface faces the display area DA side. According to this configuration, since the light emitted from the light source LS can be condensed closer to the display area DA side, it is possible to contribute much more light to the display of the image. According to this, this makes it possible to display a high-luminance image even in an environment with low external light intensity.

Figure 8:
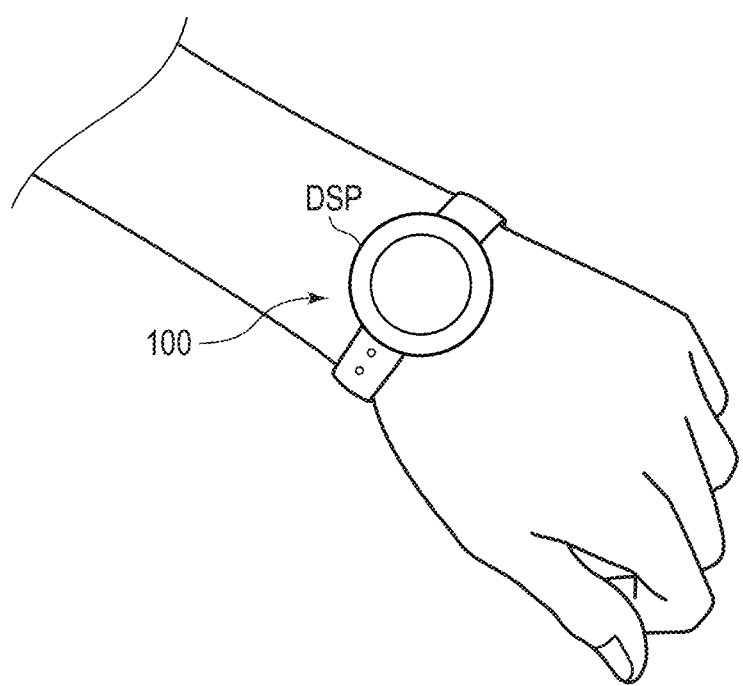
FIG. 8 is a view showing an application example of the display device according to the embodiment.

FIG. 8 shows an application example of the display device DSP according to the present embodiment. As shown in FIG. 8, the display device DSP is applied to, for example, a wristwatch 100. In this case, time, various content images, and the like are displayed in the display area DA of the display device DSP. The display device DSP can turn on the light source LS by touching the detection electrode RX disposed in the peripheral area SA, and contribute the light emitted from the light source LS to the display of the image in the display area DA.

According to the embodiment described above, it is possible to provide the display device DSP capable of improving visibility in an environment in which external light intensity is weak and capable of suppressing an increase in device size.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A display device comprising:
a first substrate;
a second substrate opposed to the first substrate;
a liquid crystal layer disposed between the first substrate and the second substrate;
a seal that bonds the first substrate to the second substrate together and seals the liquid crystal layer, wherein
the first substrate includes a light source disposed at a position overlapping the seal in a planar view, and
the light source is sealed by the seal.

2. The display device of claim 1, wherein
the second substrate includes a detection electrode disposed at a position overlapping the seal and the light source in a planar view, and
the light source is turned on when contact or approach of an external object is detected by the detection electrode.

3. The display device of claim 2, further comprising a reflection unit disposed so as to cover side surfaces of the first substrate, the second substrate, and the seal.

4. The display device of claim 2, wherein
the first substrate includes a first transparent substrate having a plate-like shape, and
the second substrate includes a second transparent substrate including a step protruding toward a side of the first substrate.

5. The display device of claim 4, wherein
the first transparent substrate has a first main surface and a second main surface opposed to the first main surface, and
the second transparent substrate has a third main surface opposed to the second main surface, a fourth main surface opposed to the third main surface, and a fifth main surface located between the third main surface and the fourth main surface in a substrate thickness direction, the fifth main surface being opposed to the fourth main surface, the fifth main surface not being opposed to the third main surface.

6. The display device of claim 5, wherein the fifth main surface overlaps the seal, the light source, and the detection electrode in a planar view.

7. The display device of claim 5, wherein
the second substrate includes a light-shielding film disposed on the fifth main surface, and
the light-shielding film has an opening at a position overlapping the light source in a planar view.

8. The display device of claim 2, wherein
the detection electrode is electrically connected to a configuration on a side of the first substrate through a conductive material included in the seal, and
the conductive material is not disposed at a position overlapping the light source in a planar view.

9. The display device of claim 2, wherein
the second substrate includes a common electrode, and
the common electrode and the detection electrode are disposed in a same layer.

10. The display device of claim 9, wherein
the second substrate includes a shielding electrode disposed between the common electrode and the detection electrode in a planar view, and
the common electrode, the detection electrode, and the shielding electrode are disposed in a same layer.

* * * * *